United States Patent
Liu et al.

(10) Patent No.: US 11,609,379 B2
(45) Date of Patent: Mar. 21, 2023

(54) STRUCTURES FOR MANAGING LIGHT POLARIZATION STATES ON A PHOTONICS CHIP

(71) Applicant: GLOBALFOUNDRIES U.S. Inc., Santa Clara, CA (US)

(72) Inventors: Yangyang Liu, Glendora, CA (US); Tymon Barwicz, Holmdel, NJ (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 168 days.

(21) Appl. No.: 17/076,358

(22) Filed: Oct. 21, 2020

(65) Prior Publication Data

US 2022/0120966 A1   Apr. 21, 2022

(51) Int. Cl.
   *G02B 6/126*    (2006.01)
   *G02B 6/13*     (2006.01)
   *G02B 6/122*    (2006.01)

(52) U.S. Cl.
   CPC ........... *G02B 6/126* (2013.01); *G02B 6/1223* (2013.01); *G02B 6/13* (2013.01)

(58) Field of Classification Search
   None
   See application file for complete search history.

(56) References Cited

U.S. PATENT DOCUMENTS

| | | | |
|---|---|---|---|
| 10,036,851 B1* | 7/2018 | Peng | G11B 5/6088 |
| 10,852,484 B2* | 12/2020 | Testa | G02B 6/4202 |
| 11,215,756 B2* | 1/2022 | Bian | G02B 6/13 |
| 2017/0023735 A1* | 1/2017 | Barwicz | G02B 6/2773 |

OTHER PUBLICATIONS

W. D. Sacher, B. Peng, J. C. Rosenberg, M. Khater, Y. Martin, J. S. Orcutt, Y. A. Vlasov, W. M. J. Green, and T. Barwicz, "An O-band Polarization Splitter-Rotator in a CMOS-Integrated Silicon Photonics Platform," in Frontiers in Optics 2016, OSA Technical Digest (online) (Optical Society of America, 2016), paper FTu2D.2.

Wesley D. Sacher, Ying Huang, Liang Ding, Tymon Barwicz, Jared C. Mikkelsen, Benjamin J. F. Taylor, Guo-Qiang Lo, and Joyce K. S. Poon, "Polarization rotator-splitters and controllers in a Si3N4-on-SOI integrated photonics platform," Opt. Express 22, 11167-11174 (2014).

(Continued)

*Primary Examiner* — Chris H Chu
(74) *Attorney, Agent, or Firm* — Thompson Hine LLP; Anthony Canale (57) ABSTRACT

Structures for managing light polarization on a photonics chip and methods of forming a structure for managing light polarization on a photonics chip. A single-mode waveguiding structure is formed that includes a first waveguide core region and a second waveguide core region positioned above the first waveguide core region. The second waveguide core region includes a first section, a second section connected to the first section, and a third section connected to the second section. The second section has a first width at an intersection with the first section and a second width at an intersection with the third section. The second width is greater than the first width. The first and second waveguide core regions contain materials of different composition.

20 Claims, 6 Drawing Sheets

(56) References Cited

OTHER PUBLICATIONS

Long Chen, Christopher R. Doerr, and Young-Kai Chen, "Compact polarization rotator on silicon for polarization-diversified circuits," Opt. Lett. 36, 469-471 (2011).
Barwicz, T., Watts, M., Popović, M. et al. Polarization-transparent microphotonic devices in the strong confinement limit. Nature Photon 1, 57-60 (2007). https://doi.org/10.1038/nphoton.2006.41.
M. R. Watts and H. A. Haus, "Integrated mode-evolution-based polarization rotators," Opt. Lett. 30, 138-140 (2005).

* cited by examiner

STRUCTURES FOR MANAGING LIGHT POLARIZATION STATES ON A PHOTONICS CHIP

BACKGROUND

The present invention relates to photonics chips and, more specifically, to structures for managing light polarization states on a photonics chip and methods of forming a structure for managing light polarization states on a photonics chip.

Photonics chips are used in many applications and systems such as data communication systems and data computation systems. A photonics chip integrates optical components, such as waveguides, optical switches, polarization splitters, and polarization rotators, and electronic components, such as field-effect transistors, into a unified platform. Layout area, cost, and operational overhead, among other factors, may be reduced by the integration of both types of components into a common chip.

Polarization splitters and polarization rotators are types of optical components commonly found in photonics chips. A polarization splitter may be configured to receive optical signals containing multiple polarization states (e.g., the fundamental transverse electric (TE0) mode and the fundamental transverse magnetic (TM0) mode) at an input channel and to separate or split the polarization states for distribution to different output channels. A polarization rotator may be configured to receive optical signals of a given polarization state (e.g., the TE0 mode) as input and to output a different polarization state (e.g., the TM0 mode).

Improved structures for managing light polarization on a photonics chip and methods of forming a structure for managing light polarization on a photonics chip are needed.

SUMMARY

In an embodiment of the invention, a structure includes a single-mode waveguiding structure having a first waveguide core region and a second waveguide core region positioned above the first waveguide core region. The second waveguide core region includes a first section, a second section connected to the first section, and a third section connected to the second section. The second section has a first width at an intersection with the first section and a second width at an intersection with the third section. The second width is greater than the first width. The first waveguide core region is comprised of a first material, and the second waveguide core region is comprised of a second material that differs in composition from the first material.

In an embodiment of the invention, a method includes forming a first waveguide core region having a sidewall, and forming a second waveguide core region positioned above the first waveguide core region to define a single-mode waveguiding structure. The second waveguide core region includes a first section, a second section connected to the first section, and a third section connected to the second section, the second section has a first width at an intersection with the first section and a second width at an intersection with the third section. The second width is greater than the first width. The first waveguide core region is comprised of a first material, and the second waveguide core region is comprised of a second material that differs in composition from the first material.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
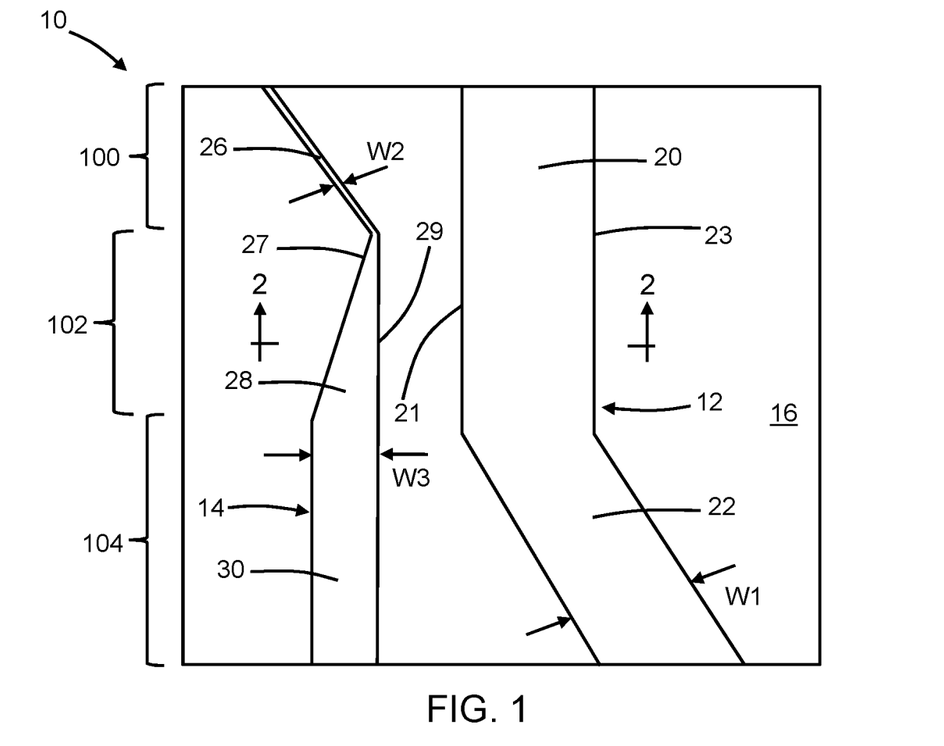
FIG. 1 is a top view of a structure for a polarization splitter at an initial fabrication stage of a processing method in accordance with embodiments of the invention.
Figure 2:
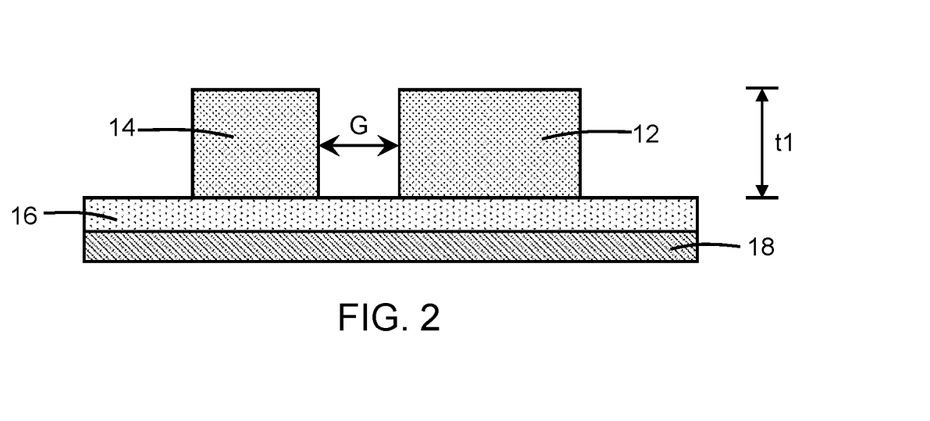
FIG. 2 is a cross-sectional view taken generally along line 2-2 in FIG. 1.

With reference to FIGS. 1, 2 and in accordance with embodiments of the invention, a structure 10 for a polarization splitting device includes a waveguide core region 12 and a waveguide core region 14 that are positioned over a dielectric layer 16 with the waveguide core region 12 laterally adjacent to the waveguide core region 14. The waveguide core regions 12, 14 may be comprised of a high refractive-index material. In an embodiment, the waveguide core regions 12, 14 may be comprised of a single-crystal semiconductor material, such as single-crystal silicon from a device layer of a silicon-on-insulator (SOI) wafer. The silicon-on-insulator wafer further includes a buried insulator layer comprised of a dielectric material, such as silicon dioxide, that provides the dielectric layer 16 and a substrate 18 comprised of a single-crystal semiconductor material, such as single-crystal silicon, under the buried insulator layer.

The waveguide core regions 12, 14 may be patterned from the device layer of the silicon-on-insulator wafer by lithography and etching processes. To that end, an etch mask is formed by a lithography process over the device layer, and unmasked sections of the device layer are etched and removed with an etching process, such as reactive ion etching. The shape of the etch mask determines the patterned shape of the waveguide core regions 12, 14. The etching process may be selected to stop on the material of the dielectric layer 16 after penetrating fully through the device layer. The waveguide core regions 12, 14 may be rectangular or substantially rectangular in cross-sectional shape. The waveguide core regions 12, 14 may have a thickness, t1. In an embodiment, the thickness, t1, may range from 150 nanometers (nm) to 170 nm. In an embodiment, the thickness, t1, may range from 140 nm to 185 nm.

The waveguide core region 12 includes a section 20 and a section 22 that are adjoined and connected in a continuous manner. The section 22 is angled relative to section 20. The different sections 20, 22 of the waveguide core region 12 may have nominally equal widths over their respective lengths. The waveguide core region 12 has a side surface or sidewall 21 that is positioned adjacent to the waveguide core region 14 and a side surface or sidewall 23 that is opposite to the sidewall 21. The sections 20, 22 of the waveguide core region 12 may have a constant or substantially constant width, W1, over their respective lengths. In an embodiment, the width, W1, may range from 340 nm to 360 nm. In an embodiment, the width, W1, may range from 320 nm to 390 nm.

The waveguide core region 14 includes a section 26, a section 28, and a section 30 that are adjoined and connected in a continuous manner. The section 26 is angled relative to section 28. The section 28 is arranged between the sections 26 and 30, each of which may be non-tapered or straight. The section 28 inversely tapers (i.e., widens) in a direction from the section 26 to the section 30 and, conversely, tapers (i.e., narrows) in a direction from the section 30 to the section 26. The section 28 has an intersection with the section 26 at one end and an intersection with the section 30 at its opposite end. The width of the section 28 changes over its length from a width, W2, at its intersection with section 26 to a width, W3, at its intersection with section 30. The width, W3, is greater than the width, W2. The section 26 may have the width, W2, over the portion of its length adjacent to the section 28, and the section 30 may have the width, W3, over the portion of its length adjacent to the section 28.

In an embodiment, the width, W2, may range from 70 nm to 90 nm, and the width, W3, may range from 175 nm to 195 nm. In an embodiment, the width, W2, may range from 50 nm to 120 nm, and the width, W3, may range from 165 nm to 205 nm. In an embodiment, each of the sections 26, 28, and 30 may have respective lengths in a range of 1 micron to 1000 microns. In an embodiment, the section 26 may have a length in a range of 2 microns to 20 microns, the section 28 may have a length in a range of 50 microns to 150 microns, and the section 30 may have a length in a range of 125 microns to 350 microns.

The waveguide core region 14 has a side surface or sidewall 29 that is positioned adjacent to the waveguide core region 12 and a side surface or sidewall 27 that is opposite to the sidewall 29. The sidewall 29 is positioned adjacent to the sidewall 21 of the waveguide core region 12 and in a spaced relationship with the sidewall 21 of the waveguide core region 12. In particular, the sidewall 29 is separated from the sidewall 21 by a gap, G. The size of the gap, G, which may be given by the perpendicular distance between the sidewalls 21, 29, varies between the section 26 of the waveguide core region 14 and the section 20 of the waveguide core region 12. The size of the gap, G, may be constant or substantially constant between the section 28 of the waveguide core region 14 and the section 20 of the waveguide core region 12. The size of the gap, G, also varies between the section 30 of the waveguide core region 14 and the section 22 of the waveguide core region 12. In an embodiment, the sidewall 29 over the section 28 of the waveguide core region 14 may be aligned parallel to the sidewall 21 over a portion of the section 20 of the waveguide core region 12. In embodiments, the size of the gap, G, between the section 20 and the section 28 may range from 190 nanometers to 210 nanometers. The size of the gap, G, between the section 26 and the section 20 and between the section 30 and the section 20 may each be greater than the size of the gap, G, between the section 28 and the section 20.

Figure 3:
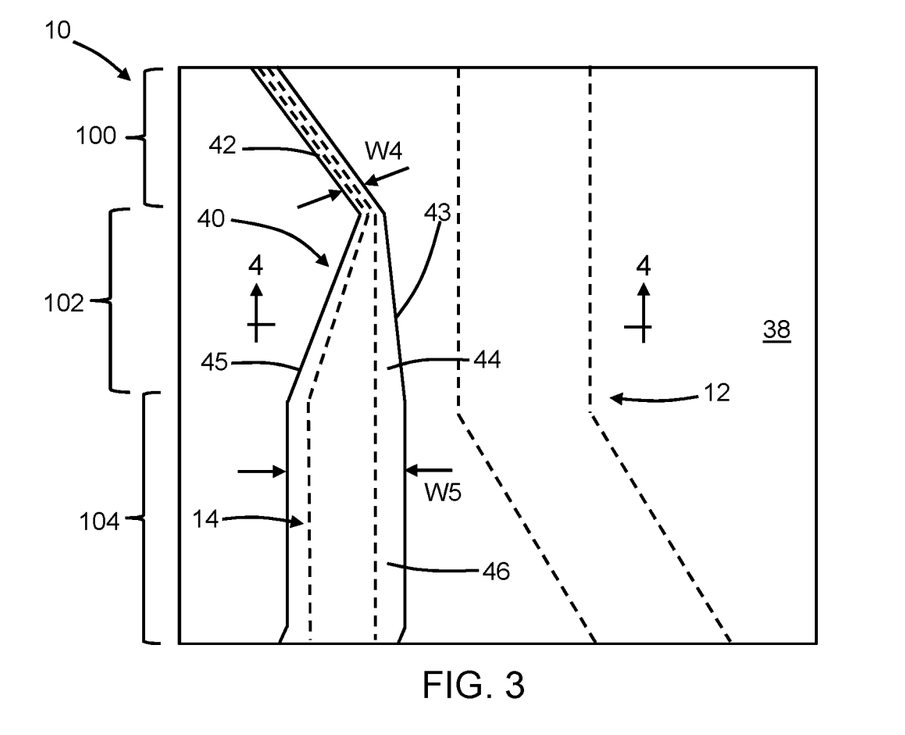
FIG. 3 is a top view of the structure at a fabrication stage subsequent to FIG. 1 and in which the lower-level waveguide core regions are shown in dashed lines.
Figure 4:
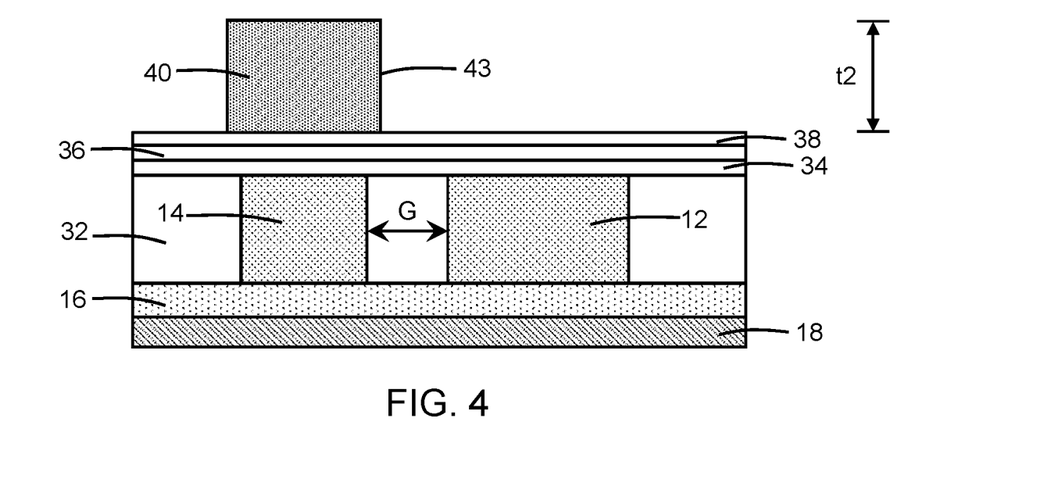
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 32 is formed over the waveguide core regions 12, 14. The dielectric layer 32 may be comprised of a dielectric material, such as silicon dioxide, deposited by chemical vapor deposition and planarized by, for example, chemical-mechanical polishing to remove topography and provide a planar surface of subsequent depositions. The waveguide core regions 12, 14 are embedded in the dielectric material of the dielectric layer 32, which operates as low-index cladding. In an embodiment, the thickness of the dielectric layer 32 may range from 140 nm to 185 nm. In an embodiment, the thickness of the dielectric layer 32 may be substantially equal to the thickness of the waveguide core regions 12, 14.

Additional dielectric layers 34, 36, 38 and a waveguide core region 40 may be formed over the dielectric layer 32. The dielectric layers 34, 36, 38 may constitute slab layers that are not patterned in the vicinity of the structure 10. In an embodiment, the dielectric layers 34, 36, 38 may lack metal that, if present, could interfere with optical engagement between the waveguide core regions 12, 14 and the subsequently formed waveguide core region 40. The dielectric layer 34 and the dielectric layer 38 may be comprised of silicon dioxide, and the dielectric layer 36 may be comprised of silicon nitride.

In an embodiment, the thickness of the dielectric layer 34 may range from 1 nm to 5 nm, the thickness of the dielectric layer 36 may range from 15 nm to 25 nm, and the thickness of the dielectric layer 38 may range from 1 nm to 5 nm. In an embodiment, the thickness of the dielectric layer 38 may range from 1 nm to 50 nm, the thickness of the dielectric layer 36 may range from 1 nm to 100 nm, and the thickness of the dielectric layer 38 may range from 1 nm to 50 nm.

The waveguide core region 40 may be positioned on the dielectric layer 38 above and over the waveguide core region 14. In an embodiment, the waveguide core region 40 may be positioned directly above and over the waveguide core region 14. The waveguide core region 40 may have a shape similar or identical to the shape of the waveguide core region 14. The waveguide core region 40 is located in a different level or horizontal plane within the structure 10 than the waveguide core regions 12, 14. In that regard, the waveguide core regions 12, 14 are positioned in a horizontal plane between the dielectric layer 16 and a horizontal plane containing the waveguide core region 40.

The waveguide core region 40 may be formed by depositing a layer of its constituent material over the dielectric layer 38 and patterning the deposited layer with lithography and etching processes. To that end, an etch mask is formed by a lithography process over the deposited layer, and unmasked sections of the deposited layer are etched and removed with an etching process, such as reactive ion etching. The shape of the etch mask determines the patterned shape of the waveguide core region 40. The etching process may be selected to stop on the material of the dielectric layer 38 after penetrating fully through the deposited layer. The waveguide core region 40 contains a material having a different composition than the material of the waveguide core regions 12, 14. In an embodiment, the waveguide core region 40 may be comprised of a dielectric material, such as silicon nitride, that is deposited by chemical vapor deposition.

The waveguide core region 40 has opposite side surfaces or sidewalls 43, 45, and the underlying waveguide core region 14 is laterally positioned within the structure 10 between the sidewalls 43, 45 of the overlying waveguide core region 40. The waveguide core region 40 may be rectangular or substantially rectangular in shape. The waveguide core region 40 may have a thickness, t2. In an embodiment, the thickness, t2, may range from 270 nm to 330 nm. In an embodiment, the thickness, t2, may range from 250 nm to 400 nm.

The waveguide core region 40 includes a section 42, a section 44, and a section 46 that are adjoined in a continuous manner. The section 42 is angled relative to section 44. The section 44 is arranged between the sections 42 and 46, each of which may be non-tapered or straight. The section 26 of the waveguide core region 14 is positioned directly beneath the section 42 of the waveguide core region 40, the section 28 of the waveguide core region 14 is positioned directly beneath the section 44 of the waveguide core region 40, and section 30 of the waveguide core region 14 is positioned directly beneath the section 46 of the waveguide core region 40. The section 46 transitions to another waveguide core region that is coupled to the structure 10.

Similar to the section 28 of the waveguide core region 14, the section 44 inversely tapers in a direction from the section 42 to the section 46 and tapers in a direction from the section 46 to the section 42. The section 44 has an intersection with the section 42 at one end and an intersection with the section 46 at its opposite end. The width of the section 44 changes over its length from a width, W4, at its intersection with section 42 to a width, W5, at its intersection with section 44. The width, W5, is greater than the width, W4. The section 42 may have the width, W4, over the portion of its length adjacent to the section 44, and the section 46 may have the width, W5, over the portion of its length adjacent to the section 44. In an embodiment, the width, W4, may be greater than the width, W2, of the waveguide core region 14, and the width, W5, may be greater than the width, W3, of the waveguide core region 14. In an embodiment, the width, W4, may range from 160 nm to 200 nm, and the width, W5, may range from 265 nm to 305 nm. In an embodiment, the width, W4, may range from 140 nm to 220 nm, and the width, W5, may range from 245 nm to 325 nm.

The sidewall 43 of the waveguide core region 40 is positioned adjacent to the sidewall 21 of the waveguide core region 12 and in a spaced and non-overlapping relationship with the waveguide core region 12. The sidewall 43 overlies the gap, G, between the sidewall 21 of the waveguide core region 12 and the sidewall 29 of the waveguide core region 14. The section 44 of the waveguide core region 40 is tapered and both of its sidewalls 43, 45 may be angled or inclined to provide the tapering. In an embodiment, the sidewalls 43, 45 may be inclined at unequal inclination angles.

The section 44 of the waveguide core region 40 is positioned directly adjacent to and above a portion of the section 20 of the waveguide core region 12. The sidewalls 27, 29 of the section 28 of the waveguide core region 14 are laterally positioned between the sidewalls 43, 45 of the section 44 of the waveguide core region 40. The sidewalls 27, 29 of the section 30 of the waveguide core region 14 are laterally positioned between the sidewalls 43, 45 of the section 46 of the waveguide core region 40. The sidewall 43 in the section 44 of the waveguide core region 40 is angled relative to the sidewall 43 in the section 46 of the waveguide core region 40. The sidewall 43 in the section 44 of the waveguide core region 40 may also be angled relative to the sidewall 21 of the adjacent portion of the section 20 of the waveguide core region 12 and the sidewall 29 of the underlying portion of the section 28 of the waveguide core region 14. The sidewall 43 in the section 46 of the waveguide core region 40 may be straight and may be aligned parallel to the sidewall 21 of the section 20 of the waveguide core region 12.

The waveguide core region 14 contains a material having a different composition than the material contained by the waveguide core region 40 and, therefore, a material having a different refractive index than the material contained by the waveguide core region 40. In an embodiment, the refractive index of the waveguide core region 40 may be less than the refractive index of the waveguide core region 14. In an embodiment, the difference in the refractive index of the material of the waveguide core region 14 and the refractive index of the material of the waveguide core region 40 may be greater than or equal to twenty-five (25) percent. In an embodiment, the difference in the refractive index of the materials of the waveguide core regions 12, 14, 40 and one or more of the cladding materials (e.g., dielectric layers 16, dielectric layers 32, 34, 36, 38, and dielectric layers 70, 72, 74, 76) may be greater than or equal to twenty-five (25) percent.

In an embodiment, the structure 10 may provide a polarization splitter that includes a waveguide core region 40, a waveguide core region 14 disposed below the waveguide core region 40 to define a single-mode waveguiding structure, and a waveguide core region 12 disposed adjacent to the waveguide core region 14. The waveguide core region 40 is comprised of a different material than the waveguide core regions 12, 14. The structure includes a transitional region 100 (FIGS. 1, 3), a transitional region 104 (FIGS. 1, 3), and a splitter region 102 (FIGS. 1, 3) that is lengthwise arranged along a waveguiding axis between the transitional region 100 and the transitional region 104. In the transitional region 100, the section 26 of the waveguide core region 14 has a cross-sectional area, the section 42 of the waveguide core region 40 has a cross-sectional area that is greater than the cross-sectional area of the section 26 of the waveguide core region 14, and the section 20 of the waveguide core region 12 has a cross-sectional area that is greater than the cross-sectional area of either of the sections 26, 42. In the transitional region 104, the section 30 of the waveguide core region 14 has a cross-sectional area, the section 46 of the waveguide core region 40 has a cross-sectional area that is greater than the cross-sectional area of the section 30 of the waveguide core region 14, and the section 22 of the waveguide core region 12 has a cross-sectional area that is greater than the cross-sectional area of either of the sections 30, 46. In the splitter region 102, the section 28 of the waveguide core region 14 has a cross-sectional area, the section 44 of the waveguide core region 40 has a cross-sectional area that is greater than the cross-sectional area of the section 28 of the waveguide core region 14, and the section 20 of the waveguide core region 12 has a cross-sectional area that is greater than the cross-sectional area of either of the sections 28, 44. The splitter region 102 is geometrically configured to split the polarization mode of a photonic signal into two photonic signals each characterized by the polarization mode. The gap, G, separating the sidewall 29 of the waveguide core region 14 from the sidewall 21 of the waveguide core region 12 is smaller in the splitter region 102 than in either of the transitional regions 100, 104. The section 28 of the waveguide core region 14 and the section 44 of the waveguide core region 40 each taper adiabatically in the splitter region 102. As used herein, adiabatic means a gradual change in a geometrical waveguide shape such that optical signals may adapt to the changing shape without significantly impacting light confinement.

The waveguide core region 14 and the waveguide core region 40 collectively provide a multi-layer, single-mode waveguiding structure in regions 102, 104. The waveguide core region 12 may also provide a single-mode waveguiding structure in regions 100, 102, 104 that is located in the same layer of the structure 10 as the waveguide core region 14. A single-mode waveguiding structure does not guide more than one transverse electric (TE) mode and more than one transverse magnetic (TM) mode. The layer stack including the dielectric layers 34, 36, 38 may provide an optical bridge between the waveguide core region 14 and the waveguide core region 40 so as to provide optical guidance in the multi-layer, single-mode waveguiding structure. The waveguide core region 40 may be in optical contact with the waveguide core region 14 inasmuch as optical contact describes a physical proximity sufficient to allow optical interaction between a pair of elements. In the splitter region 102, the waveguide core regions 14, 40 are additionally in optical interaction with waveguide core region 12.

Figure 5:
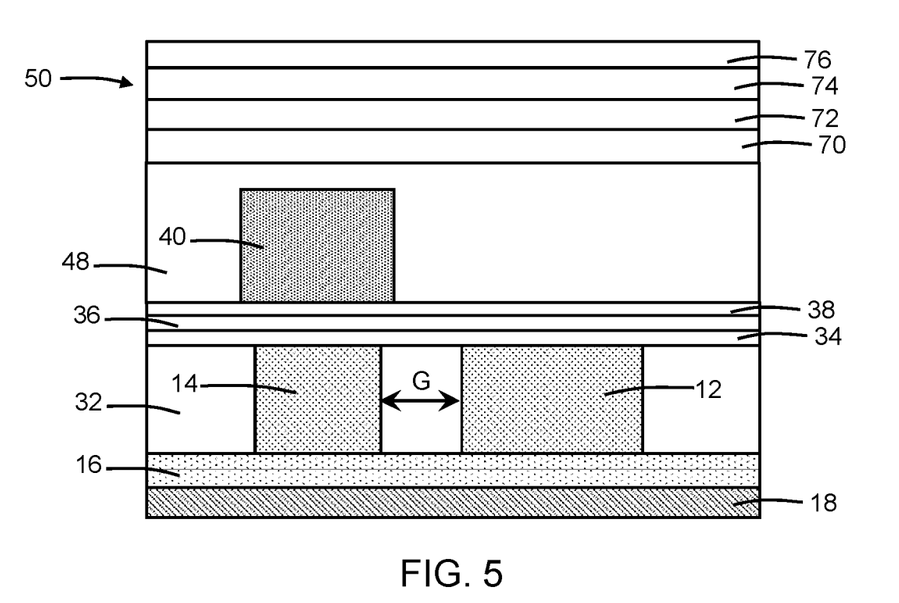
FIG. 5 is a cross-sectional view of the structure at a fabrication stage subsequent to FIG. 4.

With reference to FIG. 5 in which like reference numerals refer to like features in FIG. 4 and at a subsequent fabrication stage, a dielectric layer 48 is formed over the waveguide core region 40. The dielectric layer 48 may be comprised of a dielectric material, such as silicon dioxide, deposited by chemical vapor deposition and planarized by, for example, chemical-mechanical polishing to remove topography. The thickness of the dielectric layer 48 may be greater than the thickness of the waveguide core region 40 such that the waveguide core region 40 is embedded in the dielectric material of the dielectric layer 48. In an embodiment, the thickness of the dielectric layer 48 may range from 250 nm to 750 nm.

A back-end-of-line stack 50 may be formed over the dielectric layer 48. The back-end-of-line stack 50 includes dielectric layers 70, 72, 74, 76 that may be comprised of dielectric materials of alternating composition. In an embodiment, the dielectric layers 70, 74 may be comprised of a low-k dielectric material having a refractive index between 1.2 and 1.44, the dielectric layers 72, 76 may be comprised of a nitrogen-containing blocking dielectric material having a refractive index between 1.7 and 4, the layers 70, 74 may each have a thickness in a range of 20 nm to 3000 nm, and the layers 72, 76 may each have a thickness in a range of 5 nm to 1000 nm. In an embodiment, the dielectric layers 70, 74 may be comprised of a nitrogen-containing blocking dielectric material having a refractive index between 1.7 and 4, the dielectric layers 72, 76 may be comprised of a low-k dielectric material having a refractive index between 1.2 and 1.44, the layers 70, 74 may each have a thickness in a range of 5 nm to 1000 nm, and the layers 72, 76 may each have a thickness in a range of 20 nm to 3000 nm.

The structure 10, in any of its embodiments described herein, may be integrated into a photonics chip that includes electronic components and additional optical components. For example, the electronic components may include field-effect transistors that are fabricated by complementary metal-oxide-semiconductor (CMOS) processing.

In use, photonic or optical signals including unmodulated or modulated laser light may be guided to the structure 10 by the waveguide core region 12. For example, the optical signals may include laser light characterized by a nominal peak wavelength in the infrared band of the electromagnetic spectrum, such as a nominal peak wavelength in vacuum of 1310 nm or 1550 nm. The laser light may include multiple polarization states, such as the fundamental transverse electric (TE0) polarization state and the fundamental transverse magnetic (TM0) polarization state. The structure 10 transfers one of the polarization states, such as the TM0 polarization state, of the optical signal from the waveguide core region 12 to the composite waveguide core including the stacked waveguide core regions 14, 40. The TM0 polarization state of the optical signal is guided away from the structure 10 by the composite waveguide core, while the TE0 polarization state of the optical signal continues to be guided by the waveguide core region 12.

Alternatively, the structure 10 may function in a reversed manner to combine an optical signal with a TM0 polarization state propagating in the composite waveguide core including the stacked waveguide core regions 14, 40 within the transitional region 104 with an optical signal having a TE0 polarization state propagating in the waveguide core region 12 within the transitional region 104. After being combined, both the TE0 and TM0 signals are output from the structure 10 propagating in the transitional region 100 of waveguide core region 12.

The structure 10 provides a polarization mode converter that manages laser light to split different polarization states of substantially orthogonal polarization from the same optical path into different optical paths, or to combine different polarization states of substantially orthogonal polarization from different optical paths into the same optical path. The structure 10 may improve the insertion loss during the splitting or combining. The structure 10 may also exhibit reduced cross-talk between the waveguide core region 12 and the waveguiding structure including the waveguide core regions 14, 40. The construction of the structure 10 may be fully compatible with CMOS fabrication techniques.

Figure 6:
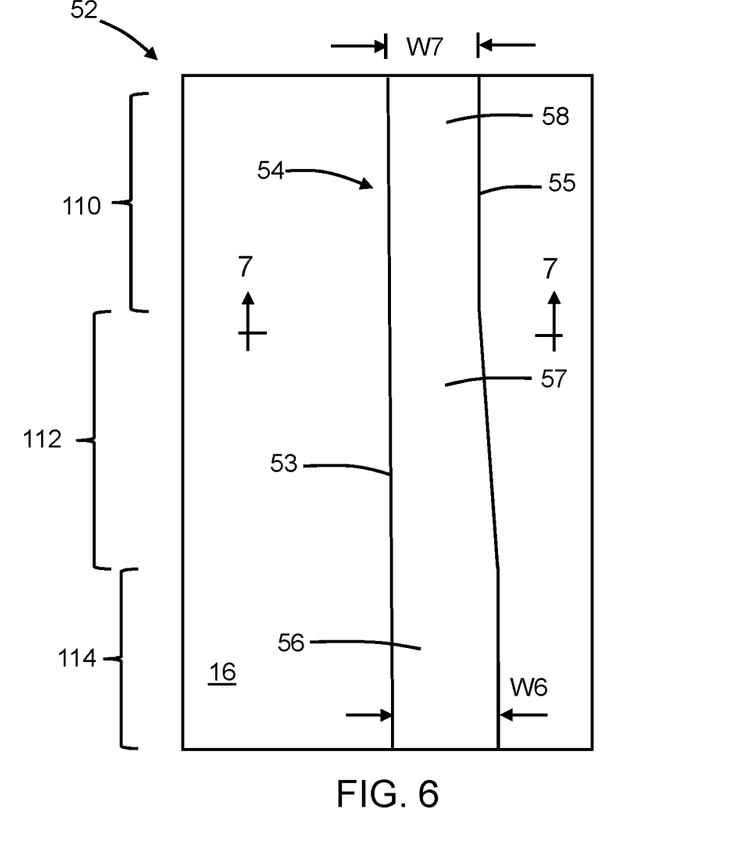
FIG. 6 is a top view of a structure for a polarization rotator at an initial fabrication stage of a processing method in accordance with embodiments of the invention.
Figure 7:
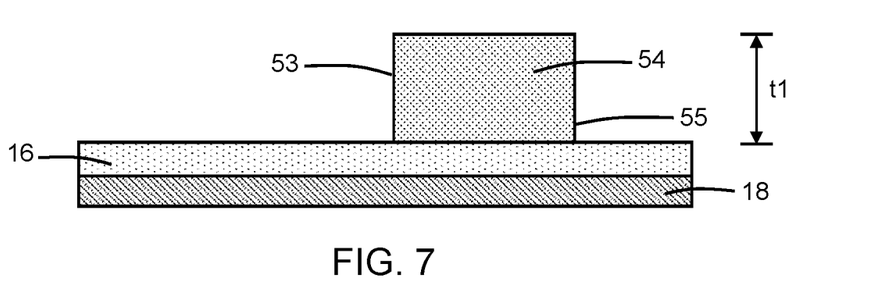
FIG. 7 is a cross-sectional view taken generally along line 7-7 in FIG. 6.

With reference to FIGS. 6, 7 and in accordance with alternative embodiments of the invention, a structure 52 for a polarization rotating device includes a waveguide core region 54 that is positioned over the dielectric layer 16. The waveguide core region 54 may be comprised of a high refractive-index material. In an embodiment, the waveguide core region 54 may be comprised of single-crystal semiconductor material, such as single-crystal silicon from a device layer of a silicon-on-insulator (SOI) wafer, and may be patterned from the device layer of the silicon-on-insulator wafer by lithography and etching processes similar to waveguide core regions 12, 14. The waveguide core region 54 may be rectangular or substantially rectangular in shape.

The waveguide core region 54 includes a section 56, a section 57, and a section 58 that are adjoined and connected in a continuous manner. The section 56 may have a constant or substantially constant width, W6. The section 58 may have a constant or substantially constant width, W7. The section 57 may taper in width from the width, W6, at the intersection with section 56 to a width, W7, at the intersection with the section 58. The waveguide core region 54 has a side surface or sidewall 53 and a side surface or sidewall 55 that is opposite to the sidewall 53. The sidewall 55 in section 57 may be inclined at an angle relative to the sidewall 55 in section 56 and the sidewall in section 58 to provide the tapering of the section 57. In an embodiment, the sidewalls 53, 55 may be straight in both section 56 and section 58. In an embodiment, the width, W6, may range from 340 nm to 360 nm, and the width, W7, may range from 175 nm to 195 nm. In an embodiment, the width, W6, may range from 320 nm to 380 nm, and the width, W7, may range from 155 nm to 215 nm.

Figure 8:
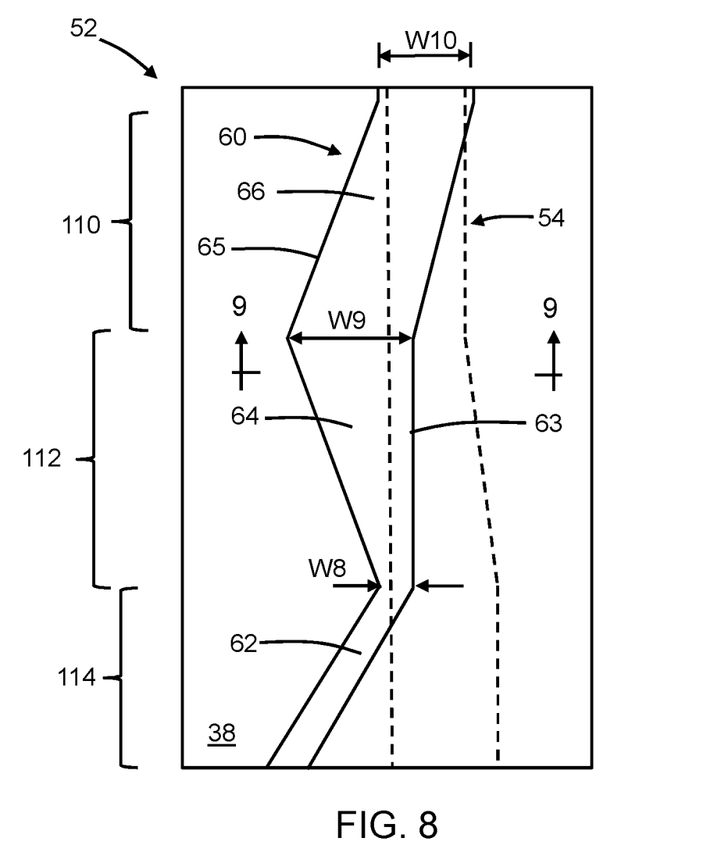
FIG. 8 is a top view of the structure at a fabrication stage subsequent to FIG. 6 and in which the lower-level waveguide core region is shown in dashed lines.
Figure 9:
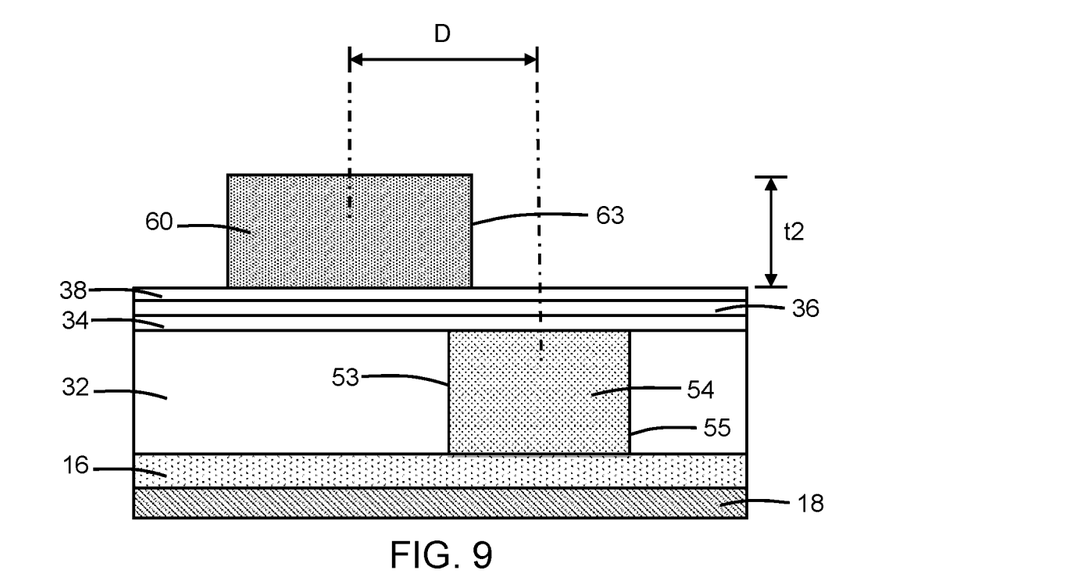
FIG. 9 is a cross-sectional view taken generally along line 9-9 in FIG. 8.

With reference to FIGS. 8, 9 in which like reference numerals refer to like features in FIGS. 6, 7 and at a subsequent fabrication stage, the dielectric layers 32, 34, 36, 38 are formed over the waveguide core region 54. A waveguide core region 60 may be formed that is positioned on the dielectric layer 38. The waveguide core region 60 is located in a different level or horizontal plane within the structure 52 than the waveguide core region 54. In that regard, the waveguide core region 54 is positioned in a horizontal plane between a horizontal plane containing the dielectric layer 16 and a horizontal plane containing the waveguide core region 60.

The waveguide core region 54 and the waveguide core region 60 collectively provide a multi-layer, single-mode waveguiding structure. The waveguide core region 60 contains a material having a different composition than the material contained by the waveguide core region 54 and, therefore, a material having a different refractive index than the material contained by the waveguide core region 54. In an embodiment, the refractive index of the waveguide core region 60 may be less than the refractive index of the waveguide core region 54. In an embodiment, the difference in the refractive index of the material of the waveguide core region 54 and the refractive index of the material of the waveguide core region 60 may be greater than or equal to twenty-five (25) percent. In an embodiment, the difference in the refractive index of the materials of the waveguide core regions 54, 60 and one or more of cladding materials (e.g., dielectric layers 16, dielectric layers 32, 34, 36, 38, and dielectric layers 70, 72, 74, 76) may be greater than or equal to twenty-five (25) percent.

The waveguide core region 60 may be formed in a manner similar to the formation of the waveguide core region 40. The waveguide core region 60 contains a material having a different composition than the material of the waveguide core region 54. In an embodiment, the waveguide core region 60 may be comprised of a dielectric material, such as silicon nitride. The waveguide core region 60 may be rectangular or substantially rectangular in shape.

The waveguide core region 60 includes a section 62, a section 64, and a section 66 that are adjoined and connected in a continuous manner. The section 62 is angled relative to the section 64, and the section 66 is also angled relative to the section 64 such that the section 66 extends across the waveguide core region 54. The section 64 is arranged between the sections 62 and 66. The section 64 inversely tapers in a direction from the section 62 to the section 66 and tapers in a direction from the section 66 to the section 62. The section 64 has an intersection with the section 62 at one end and an intersection with the section 66 at its opposite end.

The width of the section 64 changes over its length from a width, W8, at its intersection with the section 62 to a width, W9, at its intersection with the section 66. The width, W9, is greater than the width, W8. The section 62 may have the width, W8, over its length adjacent to the section 64. The width of the section 66 changes over its length from the width, W9, at its intersection with section 62 to a width, W10, that is less than the width, W9. The direction of the change in the width of the section 66 is opposite to the change of the change in the width of the section 64.

In an embodiment, the width, W8, may range from 160 nm to 200 nm, the width, W9, may range from 420 nm to 460 nm, and the width, W10, may range from 265 nm to 305 nm. In an embodiment, the width, W8, may range from 100 nm to 220 nm, the width, W9, may range from 400 nm to 480 nm, and the width, W10, may range from 265 nm to 305 nm. In an embodiment, the sections 62, 64, and 66 may have respective lengths in a range of 1 micron to 1000 microns.

In an embodiment, the section 62 may have a length in a range of 3 microns to 50 microns, the section 64 may have a length in a range of 75 microns to 300 microns, and the section 66 may have a length in a range of 150 microns to 500 microns.

The center of the waveguide core region 60 may have a center-to-center offset, D, relative to the center of the waveguide core region 54. In an embodiment, the offset at the location of width, W10, may be −20 nm to +20 nm, the offset the location of width, W9, may be 210 nm to 250 nm, and the offset at the intersection between sections 62, 64 may be 245 nm to 285 nm. In an embodiment, the offset at the location of width, W10, may be −40 nm to +40 nm, the offset the location of width, W9, may be 190 nm to 270 nm, and the offset at the intersection between sections 62, 64 may be 225 nm to 305 nm.

The section 64 of the waveguide core region 60 is positioned in part over and overlapping with the section 57 of the waveguide core region 54, and the section 66 of the waveguide core region 60 is also positioned in part over and overlapping with the section 58 of the waveguide core region 54. The waveguide core region 60 has opposite side surfaces or sidewalls 63, 65, and the sidewall 63 of the section 64 and the sidewall 63 of the section 66 are laterally positioned above and between the sidewalls 53, 55 of the underlying waveguide core region 54. The overlap of the sidewall 63 in the sections 64, 66 of the waveguide core region 60 with the sections 57, 58 of the waveguide core region 54 is continuous and unbroken.

The sidewall 65 may be angled or inclined in the section 64 to provide the tapering, and the portion of the sidewall 63 in the section 64 that overlaps with the section 57 of the waveguide core region 54 may be non-inclined and aligned parallel or substantially parallel to the sidewall 53 in the section 57 of the waveguide core region 54. The sidewall 63 in the section 66 that overlaps with the section 58 of the waveguide core region 54 may be angled relative to the sidewall 53 in the section 58 of the waveguide core region 54. In particular, the sidewall 63 of the section 66 of the waveguide core region 60 may be angled to extend fully across the section 58 of the waveguide core region 54. The sidewall 63 in the section 66 of the waveguide core region 60 is also angled relative to the sidewall 63 in the section 64 of the waveguide core region 60. In an embodiment, the section 66 of the waveguide core region 60 may be centered over the section 58 of the waveguide core region 54 at the end of the section 66 at the location of width, W10.

In an embodiment, the structure 52 includes a waveguide core region 54 and a waveguide core region 60 disposed below the waveguide core region 54 to define a single-mode waveguiding structure. The layer stack including the dielectric layers 34, 36, 38 may provide an optical bridge between the waveguide core region 54 and the waveguide core region 60 so as to provide the multi-layer, single-mode waveguiding structure. The waveguide core region 60 may be in optical contact with the waveguide core region 54 inasmuch as optical contact describes a physical proximity sufficient to allow optical interaction between a pair of elements.

The waveguide core region 60 is comprised of a different material than the waveguide core region 54. The structure includes a rotating region 110 (FIGS. 6, 8), a transitional region 114 (FIGS. 6, 8), and a rotating region 112 (FIGS. 6, 8) that is lengthwise arranged along a waveguiding axis between the rotating region 110 and the transitional region 114. In the rotating region 110, the section 58 of the waveguide core region 54 has a cross-sectional area of constant width, and the section 66 of the waveguide core region 60 has a cross-sectional area of varying width that is greater than the cross-sectional area of the section 58 of the waveguide core region 54 at any position along the length of the rotating region 110. In the transitional region 114, the section 56 of the waveguide core region 54 has a cross-sectional area that may be constant, and the section 62 of the waveguide core region 60 has a cross-sectional area that is constant and less than the cross-sectional area of the section 58 of the waveguide core region 54. In the rotating region 112, the section 57 of the waveguide core region 54 has a cross-sectional area of varying width, and the section 64 of the waveguide core region 60 has a cross-sectional area of varying width that transitions over the length of the rotating region 112 from being greater than the cross-sectional area of the section 57 of the waveguide core region 54 to being less than the cross-sectional area of the section 57 of the waveguide core region 54. Each of the rotating regions 110, 112 is geometrically configured to rotate the polarization mode of an optical signal by approximately one-eight turn in polarization angle. The waveguide core regions 54, 60 may have a constant width in the transitional region 114. The transitional region 114 has minimal to negligible impact on the polarization mode, and the waveguide core regions 54, 60 are optically disengaged in the transitional region 114. The offset, D, separating the section 66 of the waveguide core region 60 from the section 58 of the waveguide core region 54 in the rotating region 110 is smallest (e.g., centered relative to each other) at the location of the cross-section area of width, W10 and largest at the transition between sections 64, 66. The offset, D, separating the section 64 of the waveguide core region 60 from the section 57 of the waveguide core region 54 in the rotating region 112 is largest at the transition between sections 64, 66 and smallest at the transition between sections 62, 64. The section 57 of the waveguide core region 54 and the sections 64, 66 of the waveguide core region 40 each taper adiabatically.

Figure 10:
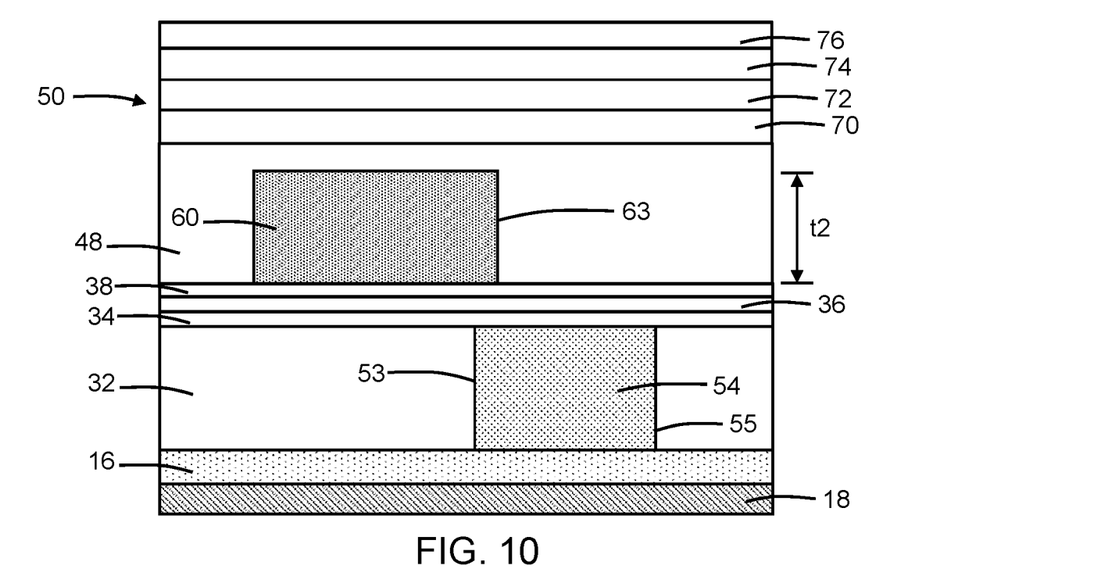
FIG. 10 is a cross-sectional view of the structure at a fabrication stage subsequent to FIG. 9.

With reference to FIG. 10 in which like reference numerals refer to like features in FIG. 9 and at a subsequent fabrication stage, dielectric layer 48 is formed over the waveguide core region 60, and the back-end-of-line stack 50 may be formed over the dielectric layer 48. The back-end-of-line stack 50 includes dielectric layers 70, 72, 74, 76 that may be comprised of dielectric materials of alternating composition. In an embodiment, the dielectric layers 70, 74 may be comprised of a low-k dielectric material having a refractive index between 1.2 and 1.44, the dielectric layers 72, 76 may be comprised of a nitrogen-containing blocking dielectric material having a refractive index between 1.7 and 4, the layers 70, 74 may each have a thickness in a range of 20 nm to 3000 nm, and the layers 72, 76 may each have a thickness in a range of 5 nm to 1000 nm. In an embodiment, the dielectric layers 70, 74 may be comprised of a nitrogen-containing blocking dielectric material having a refractive index between 1.7 and 4, the dielectric layers 72, 76 may be comprised of a low-k dielectric material having a refractive index between 1.2 and 44, the layers 70, 74 may each have a thickness in a range of 5 nm to 1000 nm, and the layers 72, 76 may each have a thickness in a range of 20 nm to 3000 nm.

The structure 52, in any of its embodiments described herein, may be integrated into a photonics chip that includes electronic components and additional optical components. For example, the electronic components may include field-effect transistors that are fabricated by CMOS processing.

In use, photonic or optical signals including modulated or unmodulated laser light may be guided to the structure 52 by the waveguide core region 12. The laser light may include a particular polarization state upon input into the structure 52 and a different polarization state upon output from the structure 52. As an example, laser light with the TM0 polarization state may enter the structure 52 guided by the section 56 of the waveguide core region 54 and, after rotation of the polarization vector, laser light with the TE0 polarization state may exit the structure 52 guided by the section 58. The portion of the structure 52 that includes the section 66 of the waveguide core region 60 may cause an approximately one-eight turn in polarization angle in connection with the position of the section 66 laterally transitioning from being centered above the section 58 to being laterally displaced from the section 58 and the section 66 adiabatically increasing in width. The portion of the structure 52 that includes the section 64 of the waveguide core region 60 may cause an approximately one-eight turn in polarization angle in connection with the position of the section 64 being laterally displaced from the section 57 with a constant overlap maintained at the sidewall 63, the section 57 adiabatically increasing in width, the section 64 adiabatically decreasing in width, and the changing offset between the waveguide core regions 54, 60. The overlap between the waveguide core region 54 and the waveguide core region 60 in the rotating regions 110, 112 provides for more efficient polarization rotation by maintaining a large optical engagement in between the waveguide core regions 54 and 60 for them to efficiently act as a multi-layer single-mode waveguiding structure. Alternatively, laser light with the TE0 polarization state may enter the structure 52 guided by the section 58 of the waveguide core region 54 and, after rotation of the polarization vector in a manner similar to that outlined, laser light with the TM0 polarization state may exit the structure 52 guided by the section 56.

The structure 52 provides a polarization mode converter that manages laser light by changing its polarization state through adiabatic rotation. The structure 52, which emulates a chiral or twisting splitter, may improve the insertion loss during polarization rotation. The structure 52 may also exhibit reduced cross-talk between the waveguide core region 54 and the waveguide core region 60. The construction of the structure 52 may be fully compatible with CMOS fabrication techniques.

In an embodiment, the structure 52 can be connected to the structure 10 to achieve both polarization splitting and polarization rotation in a combined structure. For example, the section 30 of the waveguide core region 14 may be attached to the section 56 of the waveguide core region 54 and the section 46 of waveguide core region 40 may be attached to the section 66 of the waveguide core region 60.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a first single-mode waveguiding structure including a first waveguide core region and a second waveguide core region positioned above the first waveguide core region, the second waveguide core region including a first section, a second section connected to the first section, and a third section connected to the second section, the second section having a first width at an intersection with the first section and a second width at an intersection with the third section, the second width greater than the first width, the first waveguide core region including a first section directly beneath the first section of the second waveguide core region, a second section directly beneath the second section of the second waveguide core region, and a third section directly beneath the third section of the second waveguide core region, the second section connected to the first section, the second section connected to the third section, the second section of the first waveguide core region having a third width at an intersection with the first section and a fourth width at an intersection with the third section, the fourth width is greater than the third width, the first waveguide core region comprising a first material, and the second waveguide core region comprising a second material that differs in composition from the first material.

2. The structure of claim 1 further comprising:
   a second single-mode waveguiding structure including a third waveguide core region positioned laterally adjacent to the first waveguide core region.

3. The structure of claim 2 wherein the first waveguide core region has a sidewall, the second waveguide core region has a sidewall, the third waveguide core region has a sidewall, the sidewall of the third waveguide core region is laterally spaced from the sidewall of the first waveguide core region by a gap, and the sidewall of the second waveguide core region is positioned over the gap such that the second waveguide core region is non-overlapping with the third waveguide core region.

4. The structure of claim 1 wherein the second section of the second waveguide core region is angled relative to the third section of the second waveguide core region.

5. The structure of claim 1 wherein the second waveguide core region has a first sidewall and a second sidewall, and the first waveguide core region is laterally positioned between the first sidewall and the second sidewall of the second waveguide core region.

6. The structure of claim 1 further comprising:
   a first dielectric layer and a second dielectric layer each positioned between the first waveguide core region and the second waveguide core region.

7. The structure of claim 6 wherein the first dielectric layer is comprised of silicon dioxide having a thickness in a range of 1 nm to 5 nm, and the second dielectric layer is comprised of silicon nitride having a thickness in a range of 15 nm to 25 nm.

8. The structure of claim 1 wherein the second section and the third section of the second waveguide core region have a sidewall that is continuously positioned over the first waveguide core region.

9. The structure of claim 1 wherein the second section and the third section of the second waveguide core region overlap with the first waveguide core region.

10. The structure of claim 9 wherein the third section of the second waveguide core region is angled relative in the second section of the second waveguide core region, and the third section of the second waveguide core region is angled relative to the first waveguide core region.

11. The structure of claim 1 further comprising:
    a back-end-of-line stack over the first single-mode waveguiding structure, the back-end-of-line stack including a first dielectric layer and a second dielectric layer, the first dielectric layer comprised of a low-k dielectric material having a refractive index between 1.2 and 1.44, and the second dielectric layer comprised of a nitrogen-containing blocking dielectric material having a refractive index between 1.7 and 4.

12. The structure of claim 1 wherein the first width ranges from 140 nm to 220 nm, the second width ranges from 245 nm to 325 nm, the third width ranges from 50 nm to 120 nm, and the fourth width ranges from 165 nm to 205 nm.

13. The structure of claim 1 wherein the first section of the second waveguide core region has the first width adjacent to the second section of the first waveguide core region, and the third section of the second waveguide core region has the second width adjacent to the second section of the first waveguide core region.

14. The structure of claim 13 wherein the first section of the first waveguide core region has the third width adjacent to the second section of the first waveguide core region, and the third section of the first waveguide core region has the fourth width adjacent to the second section of the first waveguide core region.

15. The structure of claim 14 wherein the first width is greater than the third width, and the second width is greater than the fourth width.

16. The structure of claim 1 further comprising:
    a substrate comprising a semiconductor material; and
    a dielectric layer on the substrate, the dielectric layer comprising a dielectric material,
    wherein the first waveguide core region is positioned on the dielectric layer.

17. The structure of claim 1 wherein the first section of the second waveguide core region is non-tapered, and the third section of the second waveguide core region is non-tapered.

18. The structure of claim 17 wherein the first section of the first waveguide core region is non-tapered, and the third section of the first waveguide core region is non-tapered.

19. The structure of claim 1 wherein the first material is silicon, and the second material is silicon nitride.

20. The structure of claim 1 wherein the second section of the first waveguide core region tapers in the same direction as the second section of the second waveguide core region.

* * * * *